United States Patent
Moon (10) Patent No.: US 8,159,917 B2
(45) Date of Patent: Apr. 17, 2012

(54) WOBBLE SIGNAL DETECTOR INCLUDING THE SIGNAL PROCESSOR, OPTICAL DISK APPARATUS INCLUDING THE WOBBLE SIGNAL DETECTOR AND READ-WRITE OPTICAL DISK DRIVE INCLUDING THE WOBBLE SIGNAL DETECTOR

(75) Inventor: Byung Ki Moon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 100 days.

(21) Appl. No.: 12/565,215

(22) Filed: Sep. 23, 2009

(65) Prior Publication Data

US 2010/0074076 A1 Mar. 25, 2010

(30) Foreign Application Priority Data

Sep. 25, 2008 (KR) .................. 10-2008-0094238

(51) Int. Cl.
*G11B 7/00* (2006.01)
(52) U.S. Cl. ....................................... 369/53.3
(58) Field of Classification Search .................. 369/53.3
See application file for complete search history.

(56) References Cited

U.S. PATENT DOCUMENTS

| | | | | | |
|---|---|---|---|---|---|
| 4,961,182 | A | * | 10/1990 | Saito et al. ............... | 369/124.15 |
| 5,233,589 | A | * | 8/1993 | Saito et al. ................ | 369/47.34 |
| 5,361,247 | A | * | 11/1994 | Fuji et al. .................... | 369/47.25 |
| 6,341,103 | B1 | * | 1/2002 | Takeda et al. ............... | 369/30.15 |
| 2002/0196717 | A1 | * | 12/2002 | Masui et al. ................ | 369/44.29 |
| 2006/0104179 | A1 | * | 5/2006 | Sakakibara et al. ....... | 369/59.15 |
| 2006/0268668 | A1 | * | 11/2006 | Lee et al. ................... | 369/44.11 |
| 2007/0280071 | A1 | | 12/2007 | Cheng et al. | |

FOREIGN PATENT DOCUMENTS

| | | |
|---|---|---|
| JP | 2001-014690 | 1/2001 |
| JP | 2006-079730 | 3/2006 |
| KR | 1020070022890 | 2/2007 |

* cited by examiner

*Primary Examiner* — Joseph Feild
*Assistant Examiner* — Aneeta Yodichkas
(74) *Attorney, Agent, or Firm* — F. Chau & Associates, LLC (57) ABSTRACT

A signal processor includes an operational amplifier performing an operation on first and second signals, and amplifying a signal resulting from the operation based on an amplification control signal to remove an offset voltage, a buffer buffering an output signal of the operational amplifier and outputting a result of the buffering as differential signals, an automatic gain amplifier automatic gain amplifying the differential signals output from the buffer and outputting an automatic gain amplified signal as a single ended signal, a level shifter level shifting a level of the single ended signal including the offset voltage and outputting a level shifted signal as level shifted differential signals, and an offset voltage compensation unit converting a difference between the level shifted differential signals to a digital signal, detecting the offset voltage based on the digital signal, and outputting the amplification control signal to compensate for the detected offset voltage.

19 Claims, 6 Drawing Sheets

WOBBLE SIGNAL DETECTOR INCLUDING THE SIGNAL PROCESSOR, OPTICAL DISK APPARATUS INCLUDING THE WOBBLE SIGNAL DETECTOR AND READ-WRITE OPTICAL DISK DRIVE INCLUDING THE WOBBLE SIGNAL DETECTOR

CROSS-REFERENCE TO RELATED APPLICATIONS

This application claims priority to Korean Patent Application No. 10-2008-0094238, filed on Sep. 25, 2008, in the Korean Intellectual Property Office, the disclosure of which is incorporated by reference in its entirety herein.

BACKGROUND

1. Technical Field

The inventive concept relates to an offset voltage compensation technology, and more particularly, to a signal processor capable of compensating for an offset voltage, a wobble signal detector including the signal processor, and an optical disk apparatus including the wobble signal detector.

2. Discussion of Related Art

In computing, an optical disk apparatus or optical disk drive is an apparatus that uses laser light or electromagnetic waves near the light spectrum as part of the process of reading or writing data to or from optical disks. Some optical disk apparatuses can only read from disks, while others can both read and write data (e.g., CD-RWs or DVD-RWs).

An optical disk is a flat, usually circular, disk which can contain audio, video or data encoded in microscopic pits (or bumps) on an encoding material on a surface of the disk. An optical disk apparatus that is configured to write data to an optical disk obtains information on the positions of tracks and sectors formed in the optical disk by detecting a wobble signal.

However, it may be difficult to detect the wobble signal due to an offset voltage that may be generated in the optical disk apparatus. Thus, there is a need for an optical disk apparatus that can compensate for an offset voltage.

SUMMARY

According to an exemplary embodiment of the inventive concept, a signal processor includes an operational amplifier, a buffer, an automatic gain amplifier, a level shifter, an A/D converter, and a controller. The signal processor may be referred to as wobble detector. The operational amplifier receives first and second signals, which each include position information of data on an optical disk. The operational amplifier sums the first and second signals to generate a summed signal, and amplifies the summed signal based on an amplification control signal to generate an output signal that excludes an offset voltage. The buffer buffers the output signal and outputs a result of the buffering as differential signals. The automatic gain amplifier automatic gain amplifies the differential signals to output a single ended signal. The level shifter level shifts a level of the single ended signal including the offset voltage and outputs a level shifted signal as level shifted differential signals by leveling up the first differential signal by the offset voltage and leveling down the second differential signal by the offset voltage. The A/D converter converts a difference between the level shifted differential signals to output a digital signal. The controller detects the offset voltage based on the digital signal and outputs the amplification control signal to the operational amplifier in response to the detected offset voltage.

According to an exemplary embodiment of the inventive concept, an optical disk apparatus includes an optical disk, a pickup apparatus, and a wobble detector. The optical disk records data. The pickup apparatus generates at least one signal to detect position information of each of a plurality of tracks or sectors formed on the optical disk, using at least one optical device. The wobble signal detector processes at least one signal output from the pickup apparatus and outputs a digital signal corresponding to the position information as a wobble signal. The wobble signal detector includes a first operational amplifier, a first buffer, a first automatic gain amplifier, a first level shifter, a first A/D converter, and a controller. The first operational amplifier performs a first operation on a first signal and a second signal output from the pickup apparatus and amplifies a first signal resulting from the first operation based on a first amplification control signal to compensate for an offset voltage. The first buffer buffers the first output signal and outputs a result of the buffering as differential signals. The first automatic gain amplifier automatic gain amplifies the differential signals to output a first single ended signal. The first level shifter level shifts a level of the single ended signal including the offset voltage to output a level shifted signal as first level shifted differential signals. The first A/D converter A/D converts a difference between the first level shifted differential signals to output a first digital signal. The controller detects the offset voltage based on the first digital signal and outputs the first amplification control signal to compensate for a detected offset voltage.

According to an exemplary embodiment of the inventive concept, a read-write optical disk drive includes a reproduction and recording unit, a wobble signal detector, and a system controller. The reproduction and recording unit reads information from an optical disk and writes information to the optical disk. The wobble signal detector detects a wobble signal from the optical disk. The system controller generates a timing clock signal based on the wobble signal to control the reproduction and recording unit to write the information to the optical disk. The wobble signal detector includes a summing amplifier, a buffer, an automatic gain amplifier, a level shifter, an A/D converter, and a controller. The summing amplifier receives first and second signals. Each of the first and second signals includes position information of data on the optical disk. The amplifier generates an output voltage from the first and second signals in response to a control signal. The buffer buffers the output signal and outputs a result of the buffering as first and second differential signals. The automatic gain amplifier performs automatic gain amplification on the first and second differential signals to output a single ended signal. The level shifter level shifts a level of the single ended signal voltage to output first and second level shifted differential signals. The A/D converter converts a difference between the first and second level shifted differential signals to generate the wobble signal. The controller detects an offset voltage from the wobble signal and outputs the control signal to the summing amplifier in response to the detected offset voltage.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Hereinafter, the inventive concept will be described in detail by explaining embodiments of the inventive concept with reference to the attached drawings. Like reference numerals in the drawings denote like elements. It will be understood that when an element is referred to as being "connected" or "coupled" to another element, it can be directly connected or coupled to the other element or intervening elements may be present.

Figure 1:
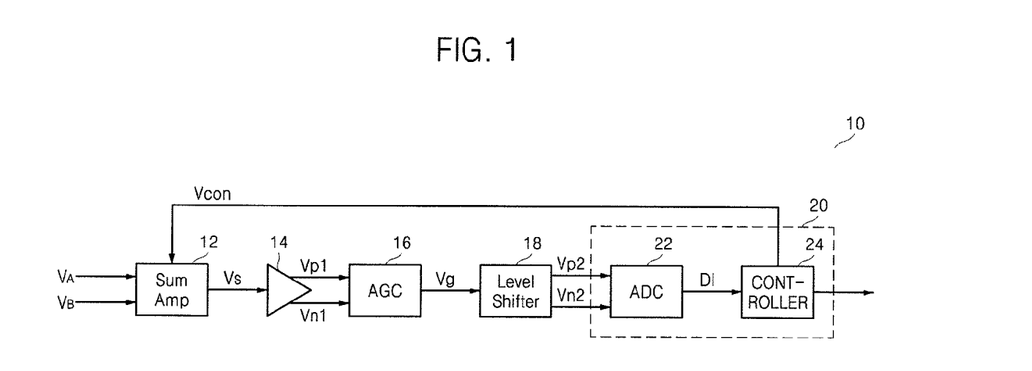
FIG. 1 is a block diagram of a signal processor according to an exemplary embodiment of the present inventive concept.
Figure 2:
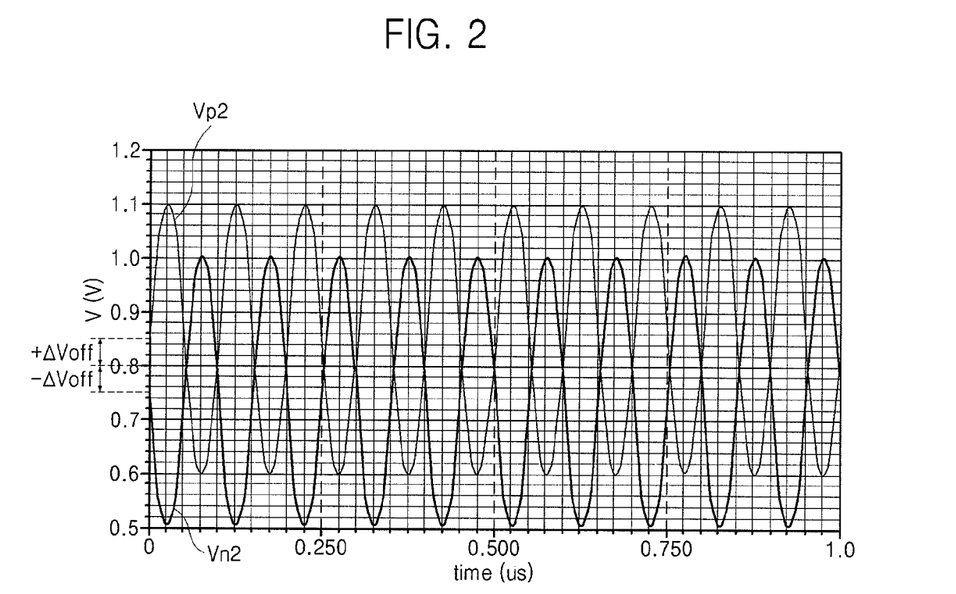
FIG. 2 is a graph showing an exemplary waveform of an output voltage of a level shifter of FIG. 1 before compensation for an offset voltage.
Figure 3:
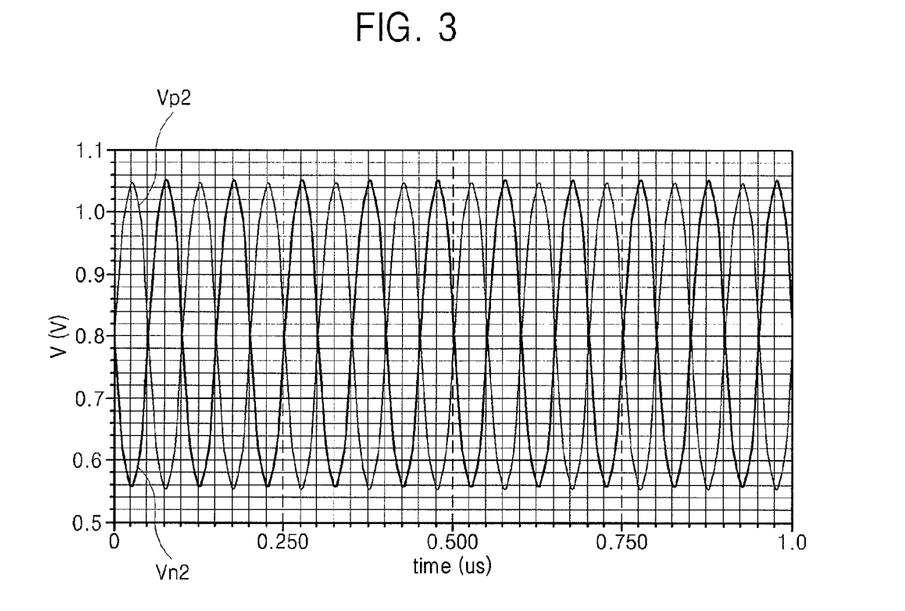
FIG. 3 is a graph showing an exemplary waveform of an output voltage of the level shifter of FIG. 1 after compensation for the offset voltage.

FIG. 1 is a block diagram of a signal processor according to an exemplary embodiment of the present inventive concept. FIG. 2 is a graph showing an exemplary waveform of an output voltage of a level shifter of FIG. 1 before compensation for an offset voltage. FIG. 3 is a graph showing an exemplary waveform of an output voltage of the level shifter of FIG. 1 after the compensation for the offset voltage.

Referring to FIGS. 1-3, a signal processor 10 may include an operational amplifier 12, a buffer 14, an automatic gain amplifier (AGC) 16, a level shifter 18, and an offset voltage compensation unit 20. The signal processor 100 may be included within an analog front end (AFE), which may condition a received analog signal and perform an analog-to-digital (A/D) conversion on the conditioned signal.

The signal processor 10 may receive a first signal $V_A$ and a second signal $V_B$ during an offset voltage $\Delta V_{off}$ compensation mode and output a signal $V_S$ removed of the offset voltage $\Delta V_{off}$ in response to an amplification control signal Vcon to compensate for or remove the offset voltage $\Delta V_{off}$. The operational amplifier 12 may receive the first and second signals $V_A$ and $V_B$, perform an operation (e.g., a summation) on the received first and second signals $V_A$ and $V_B$, and amplify the signal resulting from the operation based on the amplification control signal Vcon. The first and second signals $V_A$ and $V_B$ may be detected by optical devices different from each other, for example, A and B of FIG. 8, included in a pickup device, for example, 108 of FIG. 6, for reading information from an optical disk, for example, 102 of FIG. 6.

The offset voltage $\Delta V_{off}$ may be generated during a signal process of the signal processor 10, due to the circuit characteristics of constituent elements 12-20 of the signal processor 10, mismatch in layout of the signal processor 10, or factors in the manufacturing process of the signal processor 10. The offset voltage $\Delta V_{off}$ may distort an output signal of the signal processor 10. The operational amplifier 12 may sum the received first and second signals $V_A$ and $V_B$, amplify the sum signal based on the amplification control signal Vcon to compensate for or remove offset voltage $\Delta V_{off}$, and output an amplified signal Vs.

The buffer 14 may buffer the output signal Vs of the operational amplifier 12 and output a result of the buffering as differential signals Vp1 and Vn1. The automatic gain amplifier 16 may perform an automatic gain amplification of the differential signals Vp1 and Vn1 output from the buffer 14 to a predetermined amount and output an automatic gain amplified signal as a single ended signal Vg. The single ended signal Vg may include the offset voltage $\Delta V_{off}$ (e.g., see sample offset voltage of FIG. 2).

The level shifter 18 may level shift the level of the single ended signal Vg including the offset voltage $\Delta V_{off}$ and output a level shifted signal as level shifted differential signals Vp2 and Vn2. Of the first and second level shifted differential signals Vp2 and Vn2, the level shifter 18 levels up the first level shifted differential signal Vp2 as much as the offset voltage $\Delta V_{off}$ and levels down the second level shifted differential signal Vn2 as much as the offset voltage $\Delta V_{off}$.

For example, as in the waveform diagram of the output voltage of FIG. 2, the level shifter 18 may level up the first level shifted differential signal Vp2 (the first differential signal swinging with respect to 0.8 V) as much as the offset voltage $\Delta V_{off}$, for example, 50 mV, and level down the second level shifted differential signal Vn2 (the second differential signal swinging with respect to 0.8 V) as much as the offset voltage $\Delta V_{off}$, for example, 50 mV.

The offset voltage compensation unit 20 may perform an analog-to-digital (A/D) conversion on a difference between the first and second level shifted differential signals Vp2 and Vn2 to generate an A/D converted digital signal DI, detect the offset voltage $\Delta V_{off}$ based on the A/D converted digital signal DI, and output the amplification control signal Vcon to compensate for the detected offset voltage $\Delta V_{off}$.

The offset voltage compensation unit 20 may compare a predetermined digital signal and the A/D converted digital signal DI, and output the amplification control signal Vcon based on a result of the comparison. For example, when there is a difference between the predetermined digital signal and the A/D converted digital signal DI, the offset voltage compensation unit 20 may determine a value corresponding to the difference and output the amplification control signal Vcon to remove the offset voltage $\Delta V_{off}$. The predetermined digital signal may comprise a digital signal output from the offset voltage compensation unit 20 when the offset voltage is compensated for.

Although not shown in FIG. 1, the offset voltage compensation unit 20 may output the amplification control signal Vcon to remove the offset voltage $\Delta V_{off}$ to any one of the buffer 14, the automatic gain amplifier 16, the level shifter 18, and the offset voltage compensation unit 20. In this example, at least one of the buffer 14, the automatic gain amplifier 16, the level shifter 18, and the offset voltage compensation unit 20 may receive the amplification control signal Vcon and compensate for the offset voltage $\Delta V_{off}$ based on the received amplification control signal Vcon.

FIG. 3 is a graph showing an exemplary waveform of an output voltage of the level shifter of FIG. 1 after the compensation for the offset voltage. As shown in FIG. 3, the first and second level shifted differential signals Vp2 and Vn2 output from the level shifter 18 are differential signals swinging with respect to, for example, 0.8 V, and do not include the offset voltage $\Delta V_{off}$.

The offset voltage compensation unit 20 may include an A/D converter (ADC) 22 and a controller 24. The A/D converter 22 may A/D convert a difference between the first and second level shifted differential signals Vp2 and Vn2 and output the A/D converted digital signal DI. The controller 24 may detect the offset voltage $\Delta V_{off}$ based on the A/D converted digital signal DI output from the A/D converter 22 and output the amplification control signal Vcon to compensate for the detected offset voltage $\Delta V_{off}$. When the offset voltage $\Delta V_{off}$ is compensated for or removed, the controller 24 may perform a normal signal process by receiving the A/D converted digital signal DI in which the offset voltage $\Delta V_{off}$ is compensated for.

Figure 4:
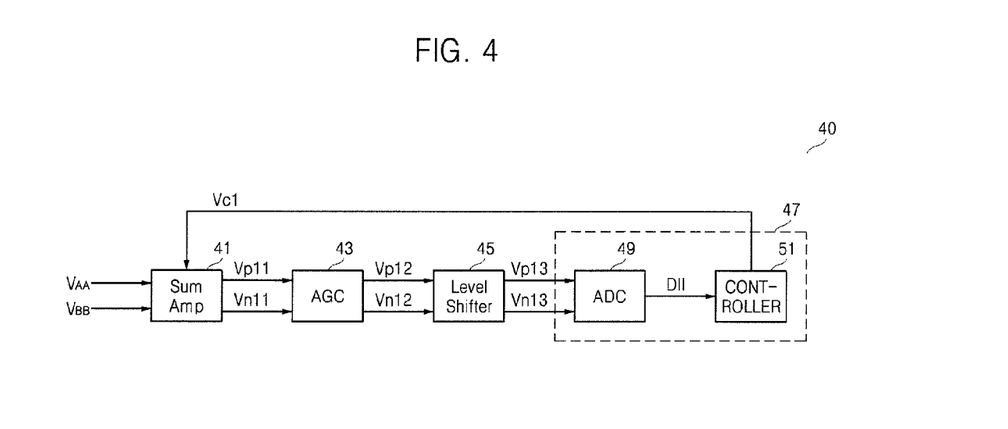
FIG. 4 is a block diagram of a signal processor according to an exemplary embodiment of the present inventive concept.
Figure 5:
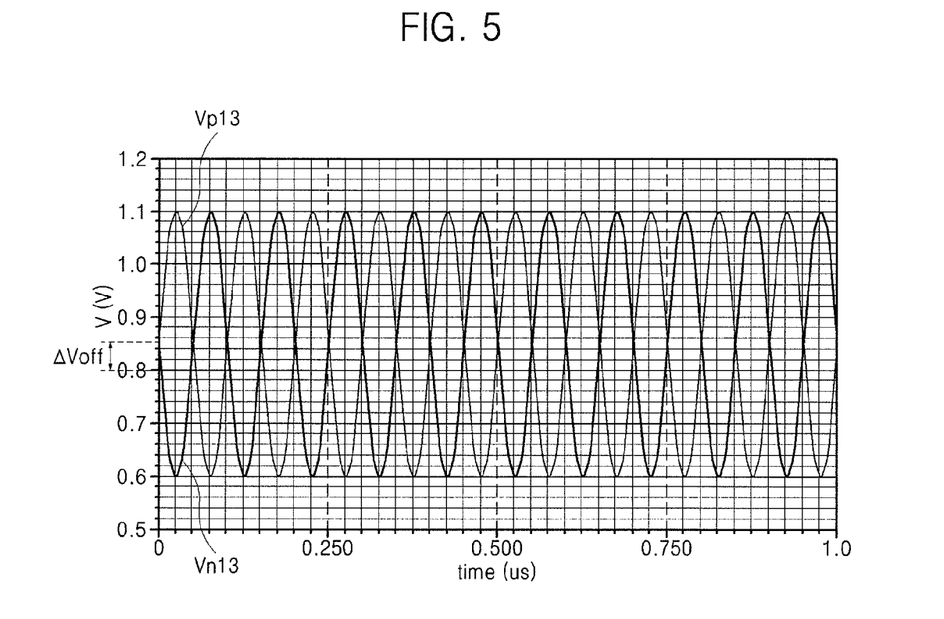
FIG. 5 is a graph showing an exemplary waveform of an output voltage of a level shifter of FIG. 4 after compensation for the offset voltage.

FIG. 4 is a block diagram of a signal processor according to an exemplary embodiment of the present inventive concept. FIG. 5 is a graph showing an exemplary waveform of an output voltage of the level shifter of FIG. 4 after the compensation for the offset voltage. Referring to FIGS. 4 and 5, a signal processor 40 may include an operational amplifier 41, an automatic gain amplifier (AGC) 43, a level shifter 45, and an offset voltage compensation unit 47.

The operational amplifier 41 may receive a first signal $V_{AA}$ and a second signal $V_{BB}$, sum the received first and second signals $V_{AA}$ and $V_{BB}$, and output a sum signal as differential signals Vp11 and Vn11 based on an amplification control signal Vc1. The automatic gain amplifier 43 may perform an automatic gain amplification on the differential signals Vp11 and Vn11 output from the operational amplifier 41 to output automatic gain amplified differential signals Vp12 and Vn12.

The level shifter 45 may level shift levels of the automatic gain amplified differential signals Vp12 and Vn12 including the offset voltage $\Delta V_{off}$ and output a level shifted signal as level shifted differential signals Vp13 and Vn13.

The offset voltage compensation unit 47 may A/D convert a difference between the level shifted differential signals Vp13 and Vn13 to generate an A/D converted digital signal DII, detect an offset voltage $\Delta V_{off}$ based on the A/D converted digital signal DII, and output the amplification control signal Vc1 to compensate for the detected offset voltage $\Delta V_{off}$. The offset voltage compensation unit 47 may include an A/D converter (ADC) 49 and a controller 51. The A/D converter 49 may A/D convert the difference between the level shifted differential signals Vp13 and Vn13 and output the A/D converted digital signal DII.

The controller 51 may detect the offset voltage $\Delta V_{off}$ based on the A/D converted digital signal DII output from the A/D converter 49 and output the amplification control signal Vc1. The level shifter 45 has a structure to receive the automatic gain amplified differential signals Vp12 and Vn12 and output the level shifted differential signals Vp13 and Vn13.

When level shifting the levels of the automatic gain amplified differential signals Vp12 and Vn12, the level shifter 45 level shifts, for example, levels up, both level shifted differential signals Vp13 and Vn13. For example, signals swinging with respect to 0.8 V, are leveled up as much as the offset voltage $\Delta V_{off}$ as illustrated in the waveform diagram of the output voltage in FIG. 5. Since the level shifter 45 equally level shifts, (for example, levels up, the level shifted differential signals Vp13 and Vn13 as much as the offset voltage $\Delta V_{off}$) the difference between the level shifted differential signals Vp13 and Vn13 does not vary before and after the level shifting. Thus, when detecting the offset voltage $\Delta V_{off}$, the offset voltage compensation unit 47 does not detect the difference between signals due to the offset voltage $\Delta V_{off}$ so that the offset voltage $\Delta V_{off}$ may not be compensated for.

In contrast, the level shifter 18 of the signal processor 10 of FIG. 1 has a structure to receive the single ended signal Vg and output the level shifted differential signals Vp2 and Vn2 (i.e., a single signal input-differential signal output structure). The level shifter 18 levels up the first differential signal Vp2 of the level shifted differential signals Vp2 and Vn2, and levels down the second differential signal Vn2 as much as the offset voltage $\Delta V_{off}$. Thus, the offset voltage compensation unit 20 of the signal processor 10 may detect and compensate for a difference value between the level shifted differential signals Vp2 and Vn2, or 1/N of the difference value, where N is a real number, for example, 2, as the offset voltage $\Delta V_{off}$.

Figure 6:
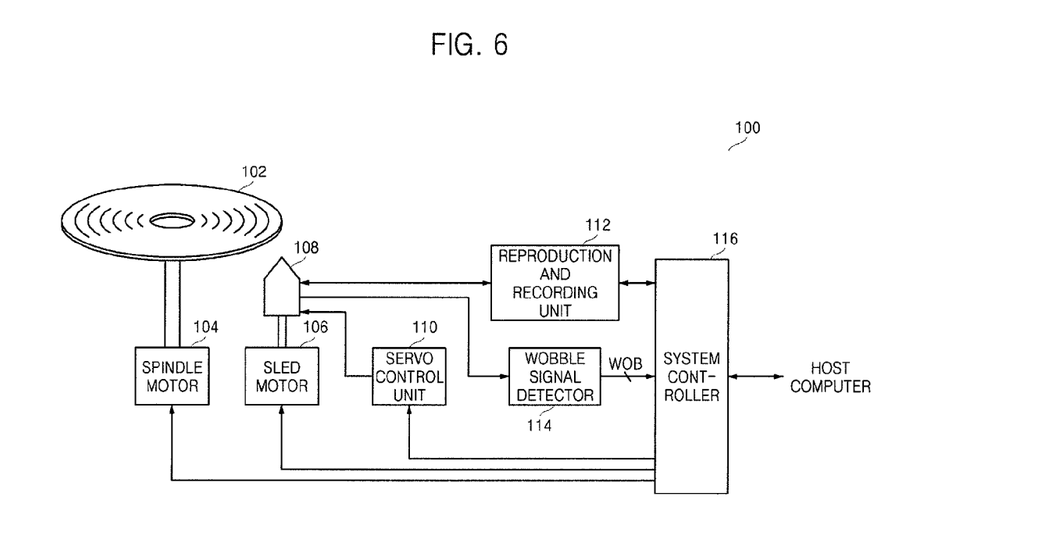
FIG. 6 is a block diagram of an optical disk apparatus according to an exemplary embodiment of the present inventive concept.
Figure 7:
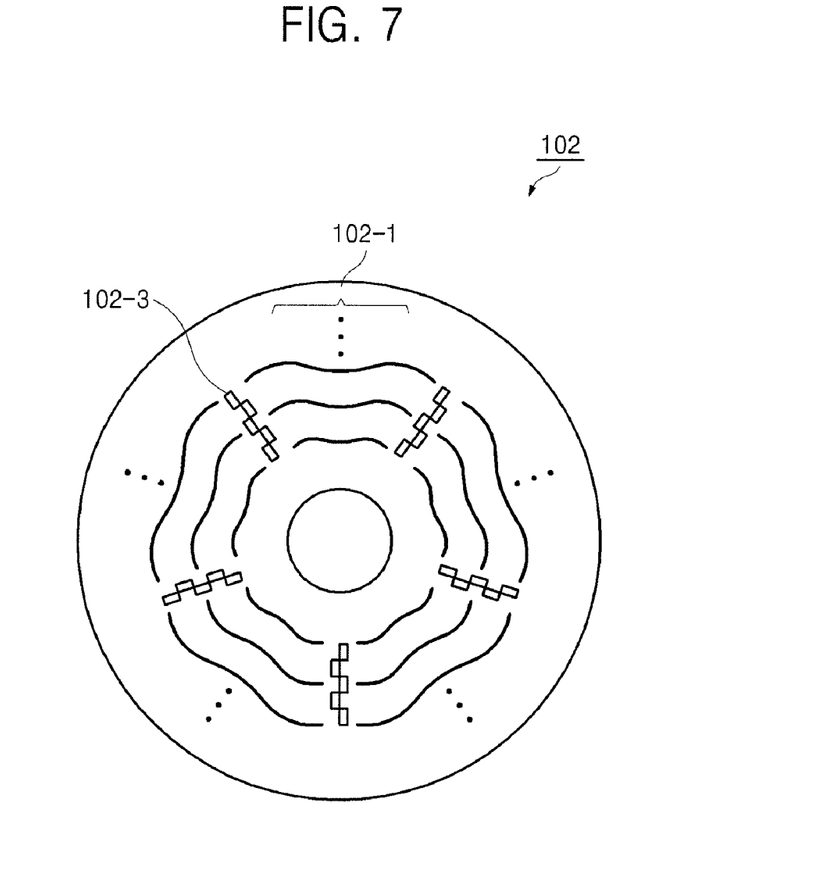
FIG. 7 illustrates an optical disk of FIG. 6 according to an exemplary embodiment of the present invention.
Figure 8:
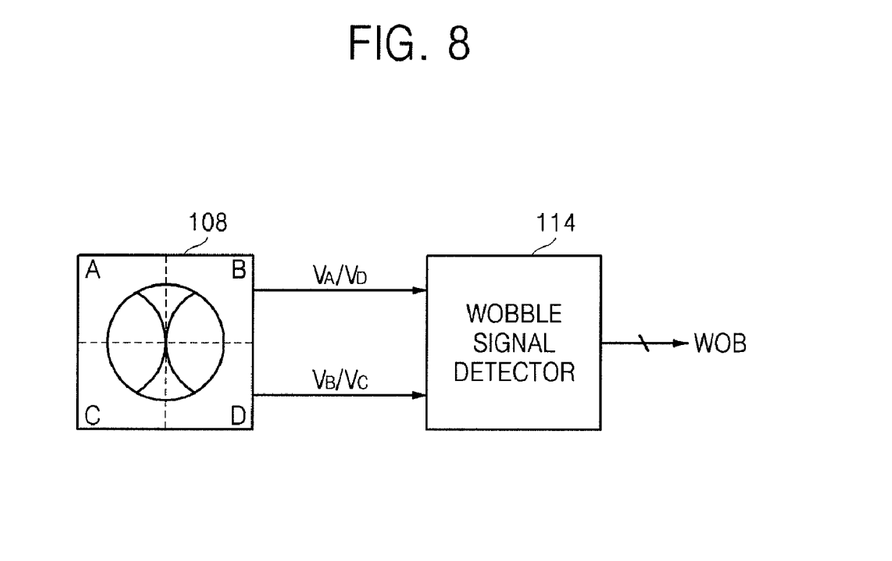
FIG. 8 is a block diagram for explaining a process of detecting a wobble signal using a pickup apparatus of FIG. 6 according to an exemplary embodiment of the present invention.
Figure 9:
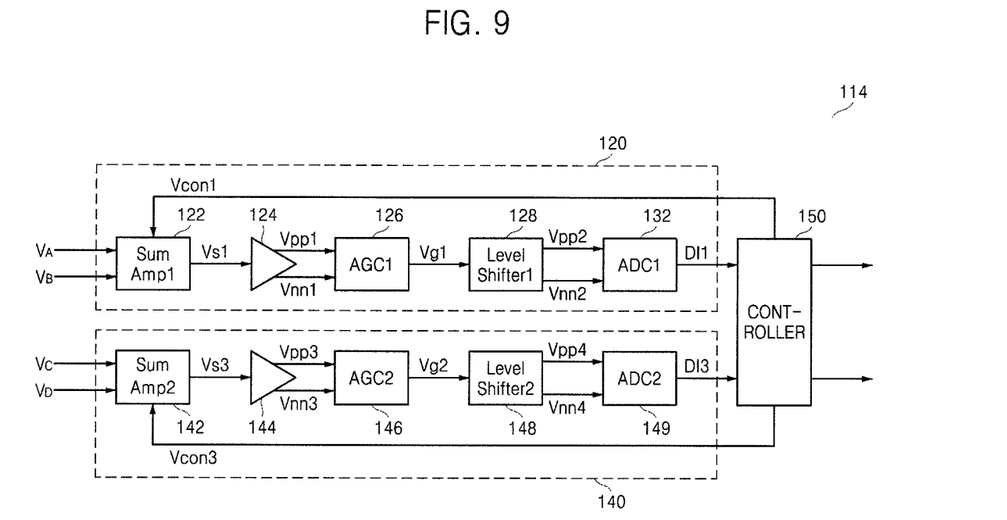
FIG. 9 is a block diagram of the wobble signal detector of FIG. 6 according to an exemplary embodiment of the present invention.

FIG. 6 is a block diagram of an optical disk apparatus 100 according to an exemplary embodiment of the present inventive concept. FIG. 7 illustrates an optical disk of FIG. 6 according to an exemplary embodiment of the inventive concept. FIG. 8 is a block diagram for explaining a process of detecting a wobble signal using the pickup apparatus of FIG. 6. FIG. 9 is a block diagram of a wobble signal detector of FIG. 6 according to an exemplary embodiment of the present invention. Referring to FIGS. 6-9, the optical disk apparatus 100 may include an optical disk 102, a spindle motor 104, a sled motor 106, a pickup apparatus 108, a servo control unit 110, a reproduction and recording unit 112, a wobble signal detector 114, and a system controller 116.

The optical disk 102 is a medium for storing data information (e.g., see FIG. 7). Tracks 102-1 and sectors may be formed on the optical disk 102. The sectors are units obtained by dividing the tracks 102-1 at an equiangular interval around the center of rotation of the optical disk 102.

Each sector may be in the range of several millimeters (mm). The length of each sector may increase from the inner circumference toward the outer circumference. The tracks 102-1 of the optical disk 102 may record data such as audio or video. Identification information indicating the position of each sector may be recorded in an identification unit 102-3. The tracks 102-1 may finely wobble at an amplitude, for example, in the range of tens of nanometers (nm) in a radial direction. The frequency of a wobble signal generated during the wobbling may vary according to the length of each sector.

The spindle motor 104 may rotate the optical disk 102 under the control of the system controller 116. The sled motor 106 may move the pickup apparatus 108 (e.g., into contact with the disk 102). The pickup apparatus 108 may read or write data with respect to the optical disk 102 under the control of the servo control unit 110. The pickup apparatus 108 may generate at least one signal to detect information on the position of each track formed on the optical disk 102, by using at least one of optical devices A, B, C, and D.

The pickup apparatus 108 may be implemented by N-number of optical devices, where N is a natural number, for example, four optical devices A, B, C, and D as illustrated in FIG. 8. First to fourth signals $V_A$, $V_B$, $V_C$, and $V_D$ respectively picked up by the four optical devices A, B, C, and D may be used as basic signals for the wobble signal detector 114 to detect a wobble signal WOB.

The wobble signal WOB may be used when the system controller 116 recognizes the information on the position of a track that is currently traced. The wobble signal WOB may be used as a basic signal to generate a timing clock signal needed for recording data.

The servo control unit 110 may drive a tracking actuator (not shown) and a focusing actuator (not shown) that are provided in the pickup apparatus 108, under the control of the system controller 116. The reproduction and recording unit 112 may read or write information with respect to the optical disk 102 using the pickup apparatus 108 under the control of the system controller 116.

The wobble signal detector 114 may process at least one of the first to fourth signals $V_A$, $V_B$, $V_C$, and $V_D$ output from the pickup apparatus 108 to compensate for a set voltage, for example, the offset voltage $\Delta V_{off}$ of FIG. 2, that may be generated by the signal detector 114, and output a digital signal corresponding to the information on the position of a track as the wobble signal WOB.

The wobble signal detector 114 may include a first wobble signal detection block 120, a second wobble signal detection block 140, and a controller 150. The first wobble signal detection block 120 may process the first signal $V_A$ and the second signal $V_B$ output from the pickup apparatus 108 based on a first amplification control signal Vcon1 to compensate for the offset voltage, and output a first digital signal DI1 in which the offset voltage is compensated for.

The first wobble signal detection block 120 may include a first operational amplifier 122, a first buffer 124, a first automatic gain amplifier 126, a first level shifter 128, and a first A/D converter 132. The first operational amplifier 122 may receive the first and second signals $V_A$ and $V_B$, perform an operation (e.g., a sum) on the received first and second signals $V_A$ and $V_B$, and amplify a resulting signal of the operation based on the first amplification control signal Vcon1 to compensate for or remove the offset voltage. The first operational amplifier 122 may sum the received first and second signals $V_A$ and $V_B$, amplify a sum signal based on the amplification control signal Vcon1, and output an amplified signal Vs.

The first buffer 124 may buffer an output signal Vs1 of the first operational amplifier 122 and output a result of the buffering as differential signals Vpp1 and Vnn2. The first automatic gain amplifier 126 may automatic gain amplify the differential signals Vpp1 and Vnn1 output from the buffer 124 and output an automatic gain amplified signal as a first single ended signal Vg1. The single ended signal Vg1 may include the offset voltage, for example, the offset voltage $\Delta V_{off}$ of FIG. 2.

The first level shifter 128 may level shift the level of the first single ended signal Vg1 including the offset voltage $\Delta V_{off}$ and output a level shifted signal as level shifted differential signals Vpp2 and Vnn2. The first level shifter 128 may level up the first differential signal Vpp2 as much as the offset voltage $\Delta V_{off}$ and level down the second differential signal Vnn2 as much as the offset voltage $\Delta V_{off}$. For example, the first level shifter 128 may level up the first differential signal Vpp2 as much as the offset voltage $\Delta V_{off}$ and level down the second differential signal Vnn2 as much as the offset voltage $\Delta V_{off}$, as in the waveform diagram of the output voltage of FIG. 2. The first A/D converter 132 may A/D convert a difference between the level shifted differential signals Vpp2 and Vnn2 to output an A/D converted digital signal DI1.

The second wobble signal detection block 140 may process a third signal $V_C$ and a fourth signal $V_D$ output from the pickup apparatus 108 based on a second amplification control signal Vcon3 and output a second digital signal DI3. The second wobble signal detection block 140 may include a second operational amplifier 142, a second buffer 144, a second automatic gain amplifier 146, a second level shifter 148, and a second A/D converter 149. Compared to the first wobble signal detection block 120, the structure and operation of the second wobble signal detection block 140 are the same or similar to those of the first wobble signal detection block 120, except for a difference that the third and fourth signals $V_C$ and $V_D$ are received instead of the first and second signals $V_A$ and $V_B$. Thus, a detailed description of the second wobble signal detection block 140 will be omitted herein.

The controller 150 may detect the offset voltage $\Delta V_{off}$ based on the first digital signal DI1 and output the amplification control signal Vcon1 to compensate for the offset voltage $\Delta V_{off}$. The controller 150 may detect the offset voltage $\Delta V_{off}$ based on a second digital signal DI3 and output an amplification signal Vcon3 to compensate for the offset voltage $\Delta V_{off}$.

The controller 150 may compare a predetermined digital signal and the A/D converted digital signal DI1 or DI3 and output the amplification control signal Vcon1 or Vcon3 based on a result of the comparison. For example, when there is a difference between the predetermined digital signal and the A/D converted digital signal DI1 or DI3, the controller 150 may determine a difference value or 1/N of the difference value, where N is a real number, for example, 2, to be the offset voltage $\Delta V_{off}$, and output the amplification control number Vcon1 or Vcon3 to remove the offset voltage $\Delta V_{off}$.

The controller 150 may detect a wobble signal based on the digital signal DI1 or DI3 corresponding to a voltage removed of the offset voltage $\Delta V_{off}$, after the compensation for the offset voltage $\Delta V_{off}$. The system controller 116 may control the spindle motor 104, the sled motor 106, and the servo control unit 110 and recognize information on the position of a track that is currently traced based on the wobble signal WOB detected by the wobble signal detector 114.

Figure 10:
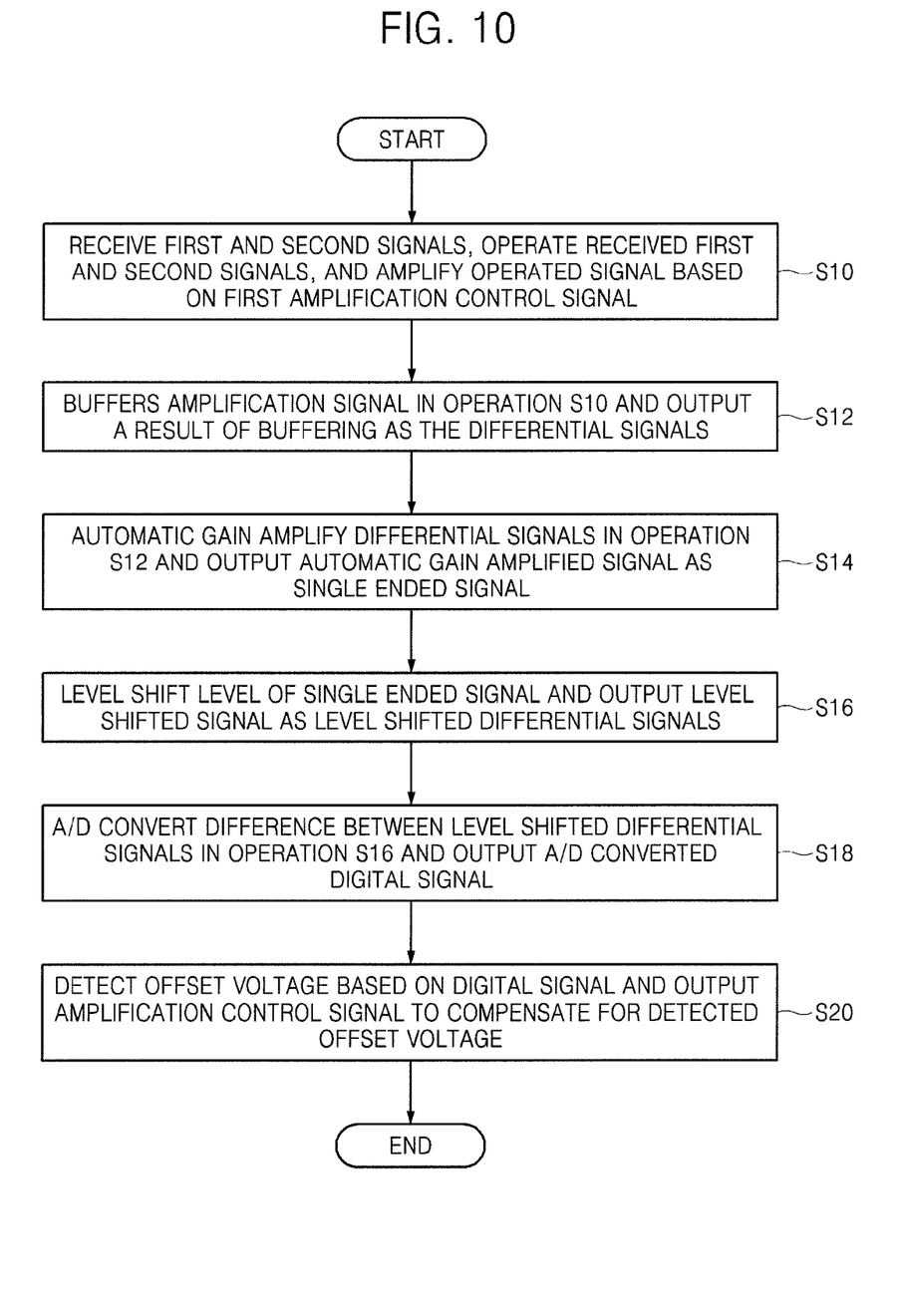
FIG. 10 is a flowchart for a method of compensating for an offset voltage according to an exemplary embodiment of the present inventive concept.

FIG. 10 is a flowchart for a method of compensating for an offset voltage according to an exemplary embodiment of the present inventive concept. Referring to FIGS. 1-3 and 10, the operational amplifier 12 receives the first and second signals $V_A$ and $V_B$, operates on the received first and second signals $V_A$ and $V_B$, and amplifies a result of the operation (e.g., an operated signal) based on the amplification control signal Vcon to compensate for or remove the offset voltage $\Delta V_{off}$ (S10).

The buffer 14 buffers the output signal $V_s$ of the operational amplifier 12 and outputs a result of the buffering as the differential signals Vp1 and Vn1 (S12). The automatic gain amplifier 16 automatic gain amplifies the differential signals Vp1 and Vn1 output from the buffer 14 to a predetermined amount and outputs an automatic gain amplified signal as the single ended signal Vg (S14).

The level shifter 18 level shifts the level of the single ended signal Vg including the offset voltage $\Delta V_{off}$ and outputs a level shifted signal as the level shifted differential signals Vp2 and Vn2 (S16).

The A/D converter 22 A/D converts the difference between the level shifted differential signals Vp2 and Vn2 and outputs the A/D converted digital signal DI (S18). The controller 24 detects the offset voltage $\Delta V_{off}$ based on the digital signal DI output from the A/D converter 22 and outputs the amplification control signal Vcon to compensate for the detected offset voltage $\Delta V_{off}$ (S20).

Apparatuses and methods according to at least one exemplary embodiment of the present inventive concept may compensate for an offset voltage that causes distortion during signal processing. Apparatuses and methods according to at least one exemplary embodiment of the present inventive concept may detect a wobble signal in which an offset voltage is compensated for. Thus, the information on the positions of tracks and sectors of an optical disk may be accurately detected.

While the inventive concept has been particularly shown and described with reference to exemplary embodiments thereof, it will be understood that various changes in form and details may be made therein without departing from the spirit and scope of the disclosure.

What is claimed is:

1. A wobble detector for an optical disk drive, the wobble detector comprising:
   an operational amplifier configured to receive first and second signals comprising position information of data on an optical disk, sum the received first and second signals to generate a summed signal, and amplify the summed signal based on an amplification control signal to generate an output signal;
   a buffer configured to buffer the output signal and output a result of the buffering as first and second differential signals, wherein a first output of the buffer outputs the first differential signal and a second output of the buffer outputs the second differential signal, wherein the first and second outputs of the buffer are distinct from one another;
   an automatic gain amplifier configured to perform an automatic gain amplification on the first and second differential signals to output a single ended signal;
   a level shifter configured to shift a level of the single ended signal including an offset voltage and output a level shifted signal as first and second level shifted differential signals by increasing a voltage level of the first differential signal by the offset voltage and decreasing a voltage level of the second differential signal by the offset voltage;
   an A/D converter configured to A/D convert a difference between the first and second level shifted differential signals to output a digital signal; and
   a controller configured to detect the offset voltage based on the digital signal and output the amplification control signal to the operational amplifier in response to the detected offset voltage.

2. The wobble signal detector of claim 1, wherein each of the first and second signals are picked up by optical devices that are different from each other and the optical devices are included in a pickup apparatus for reading information from an optical disk.

3. The wobble signal detector of claim 1, wherein the controller compares a predetermined digital signal and the A/D converted digital signal and outputs the amplification control signal based on a result of the comparison.

4. The wobble signal detector of claim 1, wherein the controller is further configured to output the amplification control signal to one of the buffer, the automatic gain amplifier, or the level shifter to remove the offset voltage.

5. An optical disk apparatus comprising:
   an optical disk configured to record data;
   a pickup apparatus configured to generate at least one signal to detect position information of each of a plurality of tracks or sectors formed on the optical disk, using at least one optical device; and
   a wobble signal detector configured to process the at least one signal output from the pickup apparatus and output a digital signal corresponding to the position information as a wobble signal, wherein the at least one signal includes a first signal and a second signal, and
   wherein the wobble signal detector comprises:
   a first operational amplifier configured to perform a first operation on the first signal and the second signal output from the pickup apparatus and amplify a first signal resulting from the first operation to generate a first output signal based on a first amplification control signal to compensate for an offset voltage;
   a first buffer configured to buffer the first output signal and output a result of the buffering as differential signals, wherein the first differential signal is an inverse of the second differential signal;
   a first automatic gain amplifier configured to automatic gain amplify the differential signals and output an automatic gain amplified signal as a first single ended signal;
   a first level shifter configured to shift a level of the single ended signal including the offset voltage and output a level shifted signal as first level shifted differential signals;
   a first A/D converter configured to A/D convert a difference between the first level shifted differential signals to output a first digital signal; and
   a controller configured to detect the offset voltage based on the first digital signal and output the first amplification control signal to compensate for a detected offset voltage,
   wherein the first level shifter is configured to increase a voltage level of a first differential signal of the first level shifted differential signals as much as the offset voltage and decrease a voltage level of a second differential signal of the first level shifted differential signals as much as the offset voltage.

6. The optical disk apparatus of claim 5, wherein the controller is configured to output the first digital signal as the wobble signal after the offset voltage is compensated.

7. The optical disk apparatus of claim 5, wherein the controller is configured to compare a predetermined digital signal and the first digital signal and output the first amplification control signal to the first operational amplifier based on a result of the comparison.

8. The optical disk apparatus of claim 5, wherein the at least one signal further include a third signal and a fourth signal, and
   wherein the wobble signal detector comprises:
   a second operational amplifier configured to perform a second operation on the third signal and the fourth signal output from the pickup apparatus and amplify a second signal resulting from the second operation to generate a second output signal based on a second amplification control signal to compensate for the offset voltage;
   a second buffer configured to buffer the second output signal and output a result of the buffering as differential signals;
   a second automatic gain amplifier configured to automatic gain amplify the differential signals and output an automatic gain amplified signal as a second single ended signal;
   a second level shifter configured to shift a level of the single ended signal including the offset voltage and output a level shifted signal as second level shifted differential signals; and
   a second A/D converter configured to A/D convert a difference between the second level shifted differential signals to output a second digital signal,
   wherein the controller detects the offset voltage based on the second digital signal and outputs the second amplification control signal to the second operational amplifier to compensate for a detected offset voltage.

9. The optical disk apparatus of claim 8, wherein the controller is configured to process the first and second digital signals and output a processed signal as the wobble signal after the offset voltage is compensated.

10. The optical disk apparatus of claim 8, wherein the second level shifter increases a voltage level of a first differential signal of the second level shifted differential signals as much as the offset voltage and decrease a voltage level of a second differential signal as much as the offset voltage.

11. The optical disk apparatus of claim 8, wherein the controller compares a predetermined digital signal and the second digital signal and outputs the second amplification control signal based on a result of the comparison.

12. A read-write optical disk drive comprising:
  a reproduction and recording unit configured to read and write information to an optical disk; and
  a wobble signal detector configured to detect a wobble signal from the optical disk; and
  a system controller configured to generate a timing clock signal based on the wobble signal to control the reproduction and recording unit to write the information to the optical disk, wherein the wobble signal detector comprises:
    a summing amplifier configured to generate an output voltage from first and second signals in response to a control signal, each of the first and second signals having position information of data on the optical disk;
    a buffer configured to buffer the output signal and output a result of the buffering as first and second differential signals, wherein a first output of the buffer outputs the first differential signal and a second output of the buffer outputs the second differential signal, wherein the first and second outputs of the buffer are distinct from one another;
    an automatic gain amplifier configured to perform an automatic gain amplification on the first and second differential signals to output a single ended signal;
    a level shifter configured to shift a level of the single ended signal voltage to output first and second level shifted differential signals;
    an A/D converter configured to A/D convert a difference between the first and second level shifted differential signals to generate the wobble signal; and
    a controller configured to detect an offset voltage from the wobble signal and output the control signal to the summing amplifier in response to the detected offset voltage.

13. The read-write optical disk drive of claim 12, wherein the level shifter increases a voltage level of the first differential signal by the offset voltage and decreases a voltage level of the second differential signal by the offset voltage.

14. The read-write optical disk drive of claim 12, wherein the controller compares a predetermined digital signal and the wobble signal and outputs the control signal based on a result of the comparison.

15. The read-write optical disk drive of claim 12, wherein the position information includes at one of identity of a track on the optical disk or identity of a sector on the optical disk.

16. The read-write optical disk drive of claim 12, further comprising a pickup apparatus to read information from the optical disk to generate the first and second signals.

17. The read-write optical disk drive of claim 16, wherein the pickup device includes a first optical device to read information from the optical disk to generate the first signal and a second and different optical device to read information from the optical disk to generate the second signal.

18. The read-write optical disk drive of claim 16, further comprising a sled motor to move the pickup apparatus into contact with the optical disk in response to a control signal from the system controller.

19. The read-write optical disk drive of claim 12, further comprising a spindle motor to rotate the optical disk in response to a control signal from the system controller.

* * * * *